United States Patent [19]
Kuntz

[11] Patent Number: 6,036,249
[45] Date of Patent: Mar. 14, 2000

[54] ACCIDENT SHIELD DEVICE

[75] Inventor: William Kuntz, Ellicott City, Md.

[73] Assignee: Eagle Inventors, L.L.C., Rehoboth Beach, Del.

[21] Appl. No.: 08/848,180

[22] Filed: Apr. 29, 1997

[51] Int. Cl.$^7$ ...................................................... B60J 9/00
[52] U.S. Cl. .......................... 296/1.1; 296/37.5; 40/593; 40/900; 160/135; 160/351
[58] Field of Search ....................... 40/591, 593; 296/1.1, 296/37.5, 37.1, 21; 135/88.13, 88.14, 88.15, 900, 902; 160/237, 351, 135, 377; 52/298; 404/10

[56] References Cited

U.S. PATENT DOCUMENTS

| | | | |
|---|---|---|---|
| 1,278,579 | 9/1918 | Borland | 160/377 |
| 1,662,586 | 3/1928 | Newman | 160/377 |
| 1,696,288 | 12/1928 | Underwood | 52/298 |
| 1,891,002 | 12/1932 | McCombie | 160/377 |
| 2,186,510 | 1/1940 | Walter et al. | 160/377 |
| 2,775,221 | 12/1956 | Olson | 52/298 |
| 3,282,001 | 11/1966 | Bigalow | 52/298 |
| 3,743,345 | 7/1973 | Eckman et al. | 135/88.13 |
| 4,124,196 | 11/1978 | Hipskind . | |
| 4,134,439 | 1/1979 | Scott . | |
| 4,186,912 | 2/1980 | Byrd, Jr. . | |
| 4,364,688 | 12/1982 | Bitvai | 404/10 |
| 4,373,570 | 2/1983 | Nussdorf et al. | 160/351 |
| 4,465,262 | 8/1984 | Itri et al. . | |
| 4,522,530 | 6/1985 | Arthur | 404/10 |
| 4,638,166 | 1/1987 | Baudro . | |
| 4,773,437 | 9/1988 | Glutting . | |
| 4,828,312 | 5/1989 | Kinkel et al. | 296/37.6 |
| 4,911,296 | 3/1990 | Hart, Jr. | 206/373 |
| 4,981,152 | 1/1991 | Laurent | 135/900 |
| 5,015,119 | 5/1991 | Schmanski . | |
| 5,029,819 | 7/1991 | Kane . | |
| 5,054,507 | 10/1991 | Sparks . | |
| 5,152,092 | 10/1992 | O'Brien . | |
| 5,197,819 | 3/1993 | Hughes | 404/13 |
| 5,269,623 | 12/1993 | Hanson . | |
| 5,414,950 | 5/1995 | Johnson, Sr. . | |
| 5,450,694 | 9/1995 | Goranson et al. . | |
| 5,469,999 | 11/1995 | Phirippidis | 224/542 |
| 5,553,648 | 9/1996 | Goharjou . | |
| 5,595,230 | 1/1997 | Guerra | 160/135 |
| 5,660,425 | 8/1997 | Weber | 135/88.13 |

*Primary Examiner*—S. Joseph Morano
*Assistant Examiner*—Long Bao Nguyen
*Attorney, Agent, or Firm*—Sterne, Kessler, Goldstein & Fox P.L.L.C.

[57] ABSTRACT

The present invention is a low cost, easy to operate, and ever handy device of blocking views of accidents, stalled cars or other incidents. This is accomplished by an accident shield device unit installed in the trunk of official vehicles which can be assembled by a single person in a few minutes. The unit consists of a screen which is large enough to prevent most passersby (motorists or pedestrians) from viewing the scene. As a result, this device aids in maintaining traffic flow and safety by preserving the natural momentum of traffic and keeping other drivers focused on traffic conditions, rather than the accident scene or stalled vehicle.

10 Claims, 9 Drawing Sheets

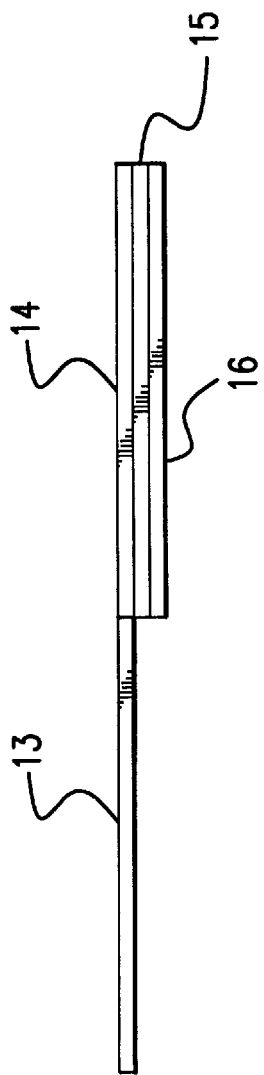
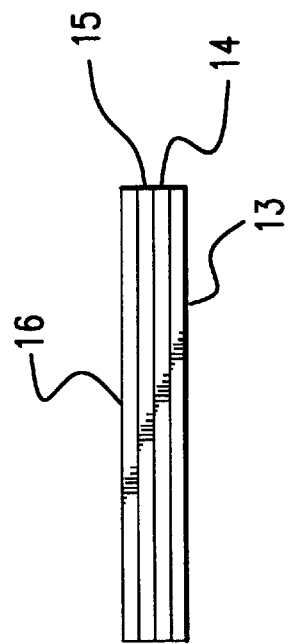
FIG.4c
FIG.4d

ACCIDENT SHIELD DEVICE

BACKGROUND OF THE INVENTION

1. Field of the Invention

This invention relates to an improvement in the art of screening devices designed to block passing motorists' and pedestrians' views of accidents, stalled cars or other roadway incidents.

2. Related Art

Accidents, stalled cars, and other roadway incidents often lead to traffic jams and additional accidents caused by curious drivers who slow down to look at the scene. Such traffic jams and accidents often continue to occur after emergency vehicles reach the scene, as the flashing lights and commotion associated with the clean-up and investigation distract other drivers. Slowdowns greatly hamper the ability of highways to facilitate large volumes of traffic and can be destructive to the environment, as harmful pollutants continue to be expended into the air while the vehicles creep along in traffic.

The problems created by onlookers are not limited to just those vehicles in the lanes adjacent to the accident scene, but may also extend to vehicles in the lanes of traffic moving in the opposite direction, due to "rubbernecking" by passing motorists. Additionally, where the incident is near pedestrian traffic, curious passersby may stop to observe and unwittingly get in the way of the emergency crews and hinder the rescue and clean-up efforts.

Therefore, there is a need for an accident shield device which will shield passing motorists' and pedestrians' vision from accidents, stalled cars or other highway incidents, thereby maintaining the flow of traffic near the incident. Such a shield should be reusable, of a temporary nature and readily available for deployment at the accident scene.

A number of devices specifically designed to restrict passing motorists' views of accident scenes are known in the art. For example, U.S. Pat. No. 5,269,623 to Hanson discloses a traffic screen which includes an elongated screen deployable into an operative position by inflation of tubular or conduit support members. However, as the base, stanchions and leg members of this device must be inflated and then a plurality of sight barriers must be set up, one between each set of stanchions, it takes a substantial amount of time to prepare this traffic screen for use. Additionally, the means of holding the screen in place, such as the use of a magnetic plate connected to the shield or the use of a weighted material such as sand carried in the base, are either of questionable reliability or pose obvious logistical problems.

U.S. Pat. No. 4,186,912 to Byrd, Jr. discloses an accident screen which consists simply of an elongated fabric screen and plastic support posts which support the screen through the use of numerous mounting cables. However, as each of the mounting cables must be attached to nearby stationary objects, additional set-up time is required to find a sufficient stationary object and attach the mounting cables to it.

U.S. Pat. No. 4,124,196 to Hipskind discloses a portable device for screening off an accident scene from view utilizing an elongate sheet of thin flexible material wound up like a curtain on a rod within a portable cylindrical container, where the sheet is unwound when deployed. This invention is cumbersome to set up, however, as numerous poles must be threaded through the sheet at various locations to provide support to the screening device and a number of portable cylindrical containers must then be stacked on top of each other to provide for a screen tall enough to effectively block off an accident scene.

SUMMARY OF THE INVENTION

According to the present invention, there is an accident shield device which is quicker and easier to assemble than the devices known in the art and has a more stable support means than those previously suggested. The accident shield device according to the present invention may be attached to a vehicle at the accident scene through the use of a mounting means disposed in the trunk space of the vehicle. The accident shield device according to the present invention comprises a plurality of foldable panels, detachably secured to the mounting means, and a non-transparent screen, which may be inflatable, detachably secured to the foldable panels, thereby restricting the passing motorists' and pedestrians' views of accidents, stalled cars or other roadway incidents. Additionally, the foldable panels are further comprised of collapsible frame members, wherein the collapsible frame members can be collapsed and the foldable panels can be folded to allow the accident shield device to be stored in a box in the trunk of the vehicle, when detached from the support means.

A spring loaded button may be disposed on a collapsible frame member for interacting with a receiving hole on the collapsible frame member, so that the frame member is secured in an erect state when the spring loaded button is received in the receiving hole.

Additionally, the accident shield device may be rotatably supported by the mounting means disposed in the trunk space of the vehicle, so that the screen can be positioned at various angles with respect to the vehicle to provide for different vision shielding arrangements.

BRIEF DESCRIPTION OF THE FIGURES

An embodiment of the present invention will be described in accordance with the following drawing figures, in which similar reference numbers are used to describe similar elements.

FIG. 4c is a top plan view of an accident shield device according to the present invention where the expandable panels for supporting a screen are in a partially folded position.

FIG. 4d is a top plan view of an accident shield device according to the present invention where the expandable panels for supporting a screen are in a folded position.

DETAILED DESCRIPTION OF THE PREFERRED EMBODIMENT

Figure 1:
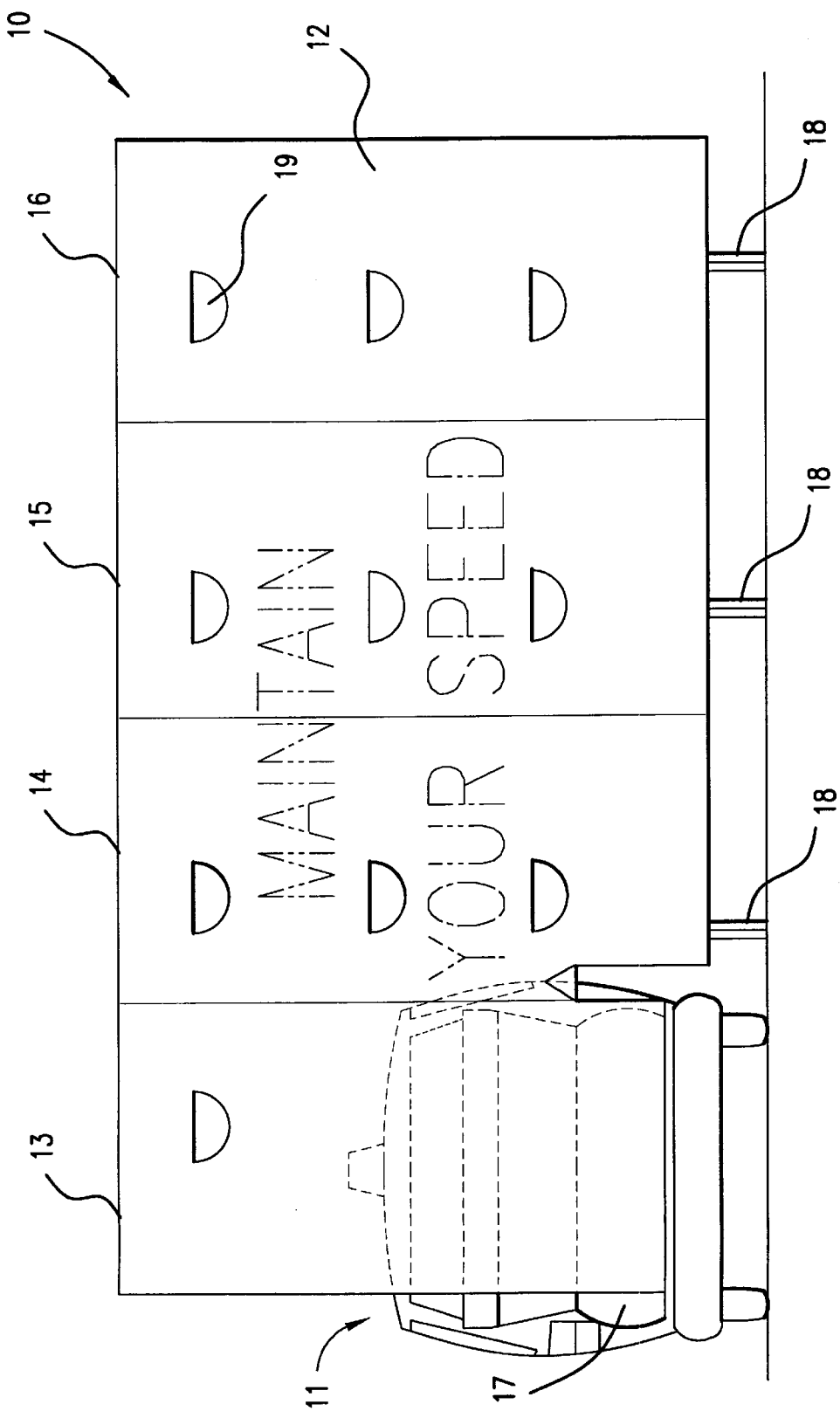
FIG. 1 is rear view of a vehicle with an accident shield device according to the present invention in a fully deployed position.

In FIG. 1, accident shield device 10 is shown in its fully deployed position and attached to vehicle 11. Vehicle 11 may comprise a rescue vehicle, a patrol vehicle, or another vehicle at an accident site. Accident shield 10 consists of a non-transparent, inflatable screen 12 disposed within or otherwise attached to vertical panel 13, and lateral panels 14, 15, 16. Vertical panel 13 is disposed directly above vehicle 11 and lateral panels 14, 15, 16 extend out from vehicle 11 to screen the accident site.

Figure 2:
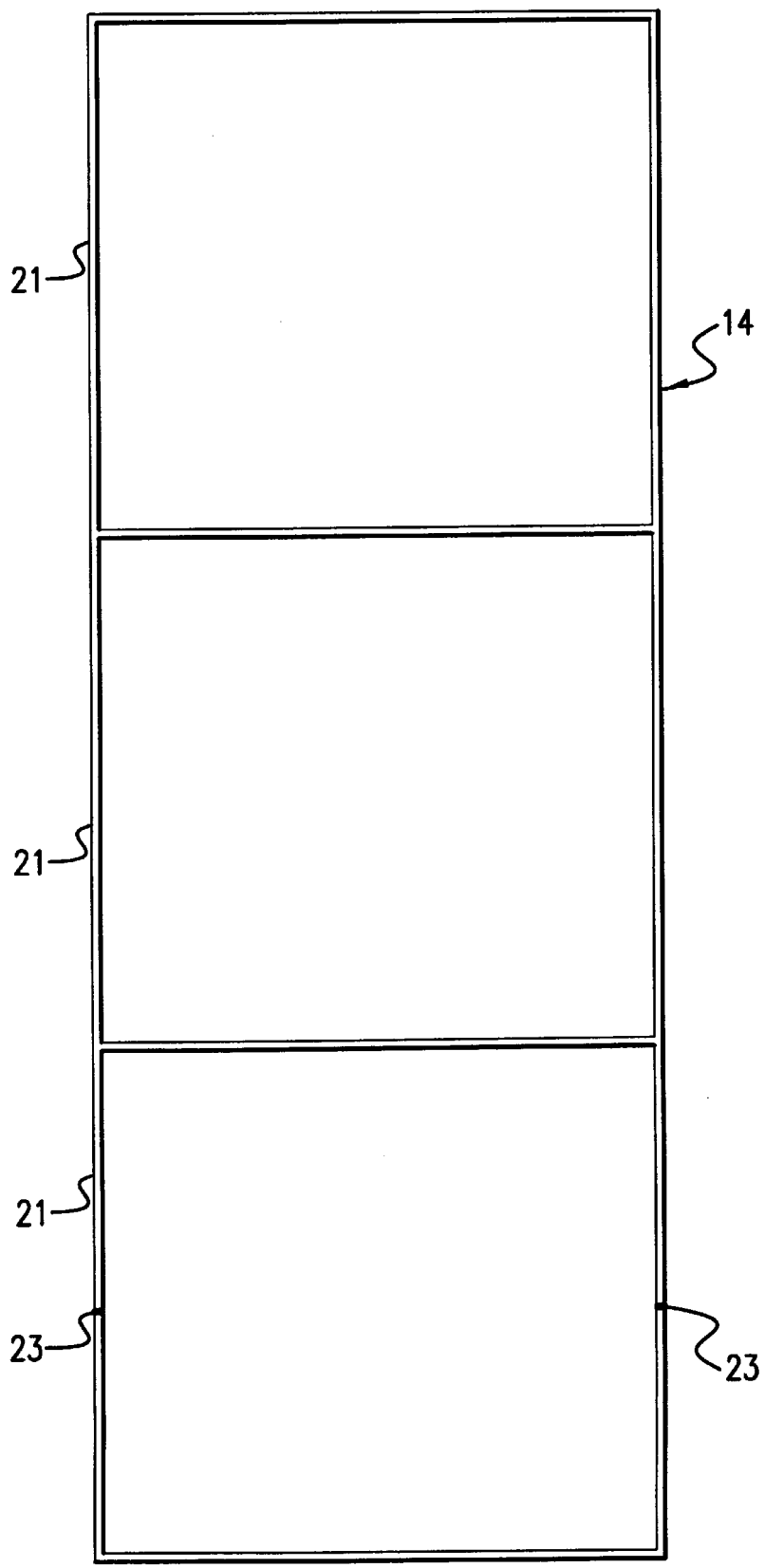
FIG. 2 is a front view of a panel of the accident shield device according to the present invention in an expanded position.

As shown in FIG. 2, lateral panel 14 consists of three frame sections 21, which can be made of metal, plastic, or other like material. Similarly, lateral panels 15 and 16 are comprised of three frame sections 21, while vertical panel 13 consists of only two frame sections 21. By way of example only, frame sections 21 may measure 3'x4', so that in the erected state, lateral panels 14, 15, 16 are 9'x4' and vertical panel 13 is 6'x4'.

Figure 3A:
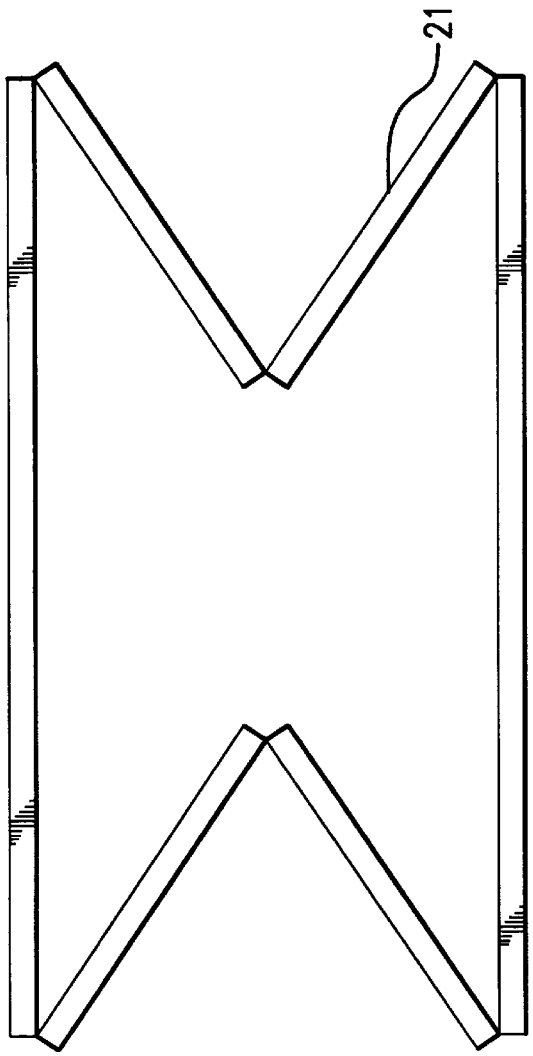
FIG. 3a is a front view of a frame section of an expandable panel of the accident shield device according to the present invention in a partially collapsed position.
Figure 3B:
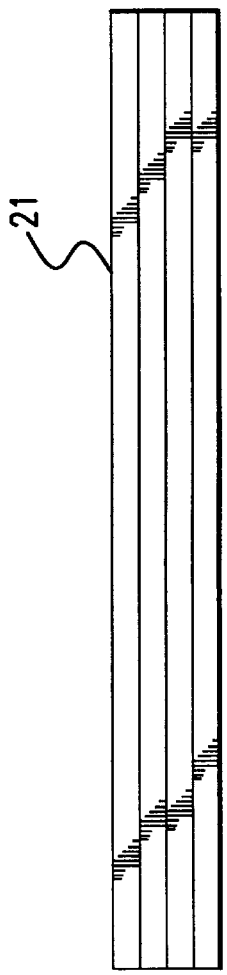
FIG. 3b is a front view of a frame section of an expandable panel of the accident shield device according to the present invention in a collapsed position.

Frame sections 21 are designed to collapse such that panels 13, 14, 15, 16 may readily fit within a box which occupies a portion of trunk space 17 of vehicle 11. FIG. 3a shows a single frame section 21 in a partially collapsed state, while FIG. 3b shows frame section 21 fully collapsed. Each frame section 21 of accident shield device 10 may be erected and collapsed manually with ease, by the pressure of a single individual. In this regard, panels 13, 14, 15, 16 should be designed so that a pressure of less than 50 pounds applied by the individual will be sufficient to collapse frame section 21.

Figure 5A:
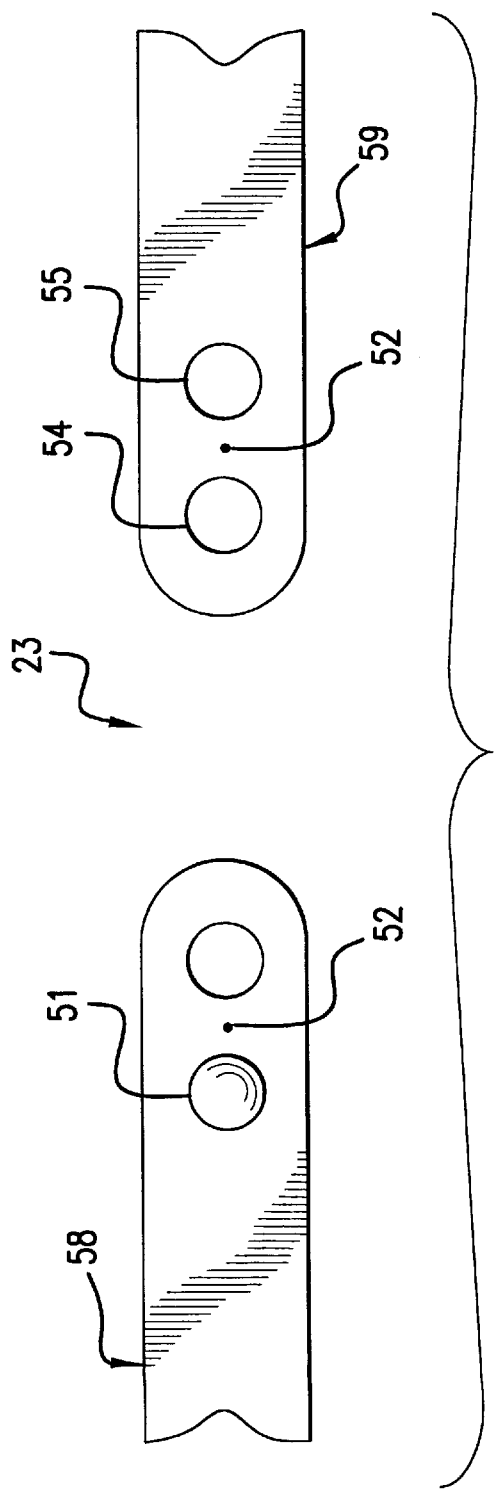
FIG. 5a is a front view of a male and a female end of a frame section of an expandable panel for supporting a screen according to the present invention.
Figure 5B:
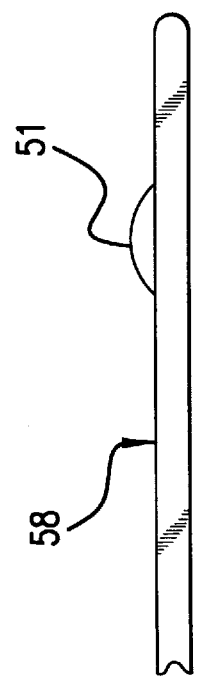
FIG. 5b is a side view of a male end of a frame section of an expandable panel for supporting a screen according to the present invention.

To lock frame section 21 in its erected state, spring loaded, button-type catch 51 (see FIGS. 5a and 5b), which jumps into place when correctly positioned, is employed at hinges 23 of frame sections 21. FIG. 5a shows male end 58 and female end 59 of hinge 23, where male end 58 and female end 59 are pivotally connected at pivot 52. In the erect position, spring loaded, button-type catch 51 of male end 58 is securably received in hole 54 of female end 59. Under the pressure of a single individual, catch 51 can be disengaged from hole 54, thereby allowing male end 58 and female end 59 to be pivoted about pivot 52, collapsing section 21, until catch 51 jumps into hole 55, locking section 21 in the collapsed position. Similarly, to erect section 21, catch 51 is disengaged from hole 55 under the pulling force of a single individual, thereby allowing male end 58 and female end 59 to be pivoted about pivot 52, until section 21 is locked in its erect position, as described above.

Figure 4A:
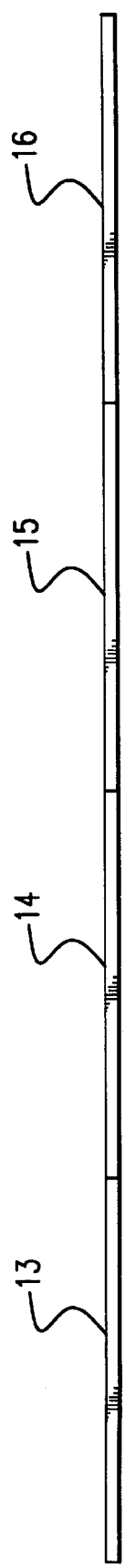
FIG. 4a is a top plan view of an accident shield device according to the present invention where the expandable panels for supporting a screen are in an unfolded position.
Figure 4B:
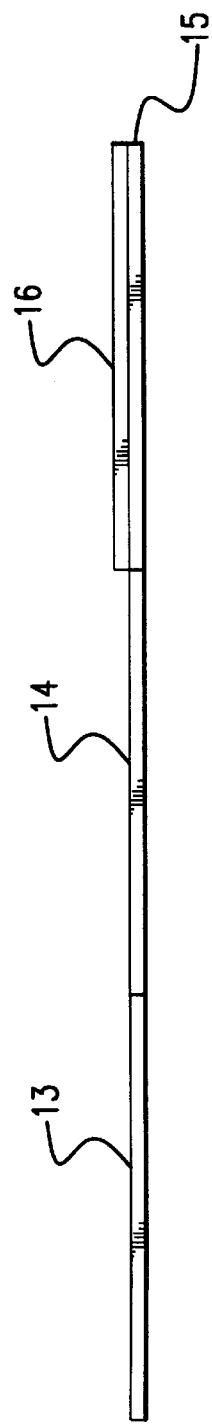
FIG. 4b is a top plan view of an accident shield device according to the present invention where the expandable panels for supporting a screen are in a partially folded position.

Panels 13, 14, 15, 16 are also designed such that after collapsing sections 21, lateral panels 14, 15, 16 may be folded onto each other and onto vertical panel 13. Such folding permits panels 13, 14, 15, 16 to fit compactly within trunk space 17 of vehicle 11. FIGS. 4a, 4b, 4c, and 4d show the process by which lateral panels 14, 15, 16, are folded onto vertical panel 13. FIG. 4a shows panels 13, 14, 15, and 16 in their unfolded position. In FIG. 4b, lateral panel 16 is folded onto lateral panel 15. Then, as shown in FIG. 4c, lateral panels 15, 16 are folded onto lateral panel 14. Finally, as shown in FIG. 4d, lateral panels 14, 15, 16 are folded onto vertical panel 13. Conventional hinges (not shown) are disposed on panels 13, 14, 15, 16 to allow for the above described folding.

Figure 6:
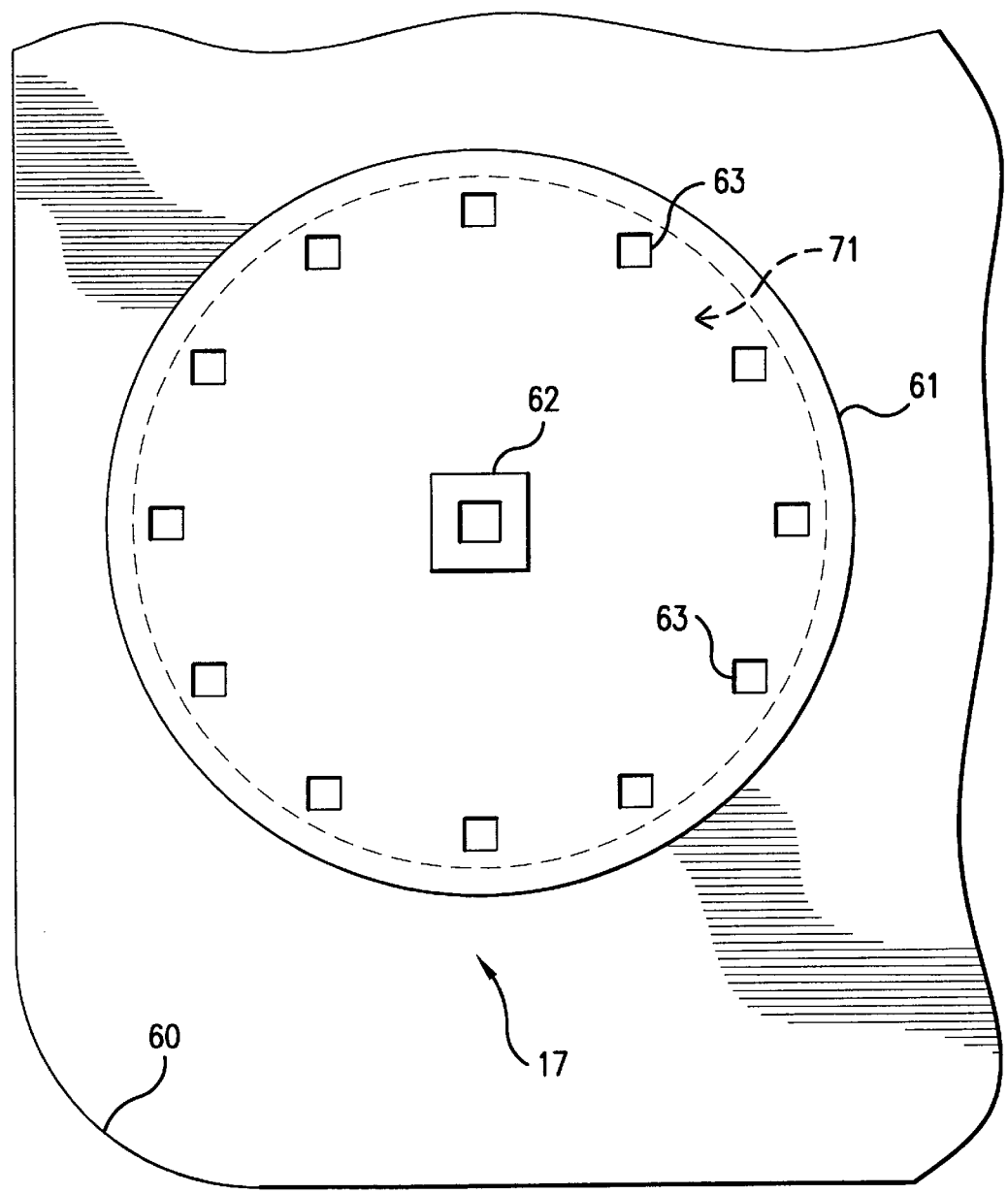
FIG. 6 is a top plan view of a support unit according to the present invention disposed within a vehicle trunk.

Vertical panel 13 is directly attached to the body of vehicle 11 via support unit 61. Such attachment securely anchors accident shield device 10 and provides stability during high winds or turbulence caused by the rapid passage of large trucks or cars. As shown in FIG. 6, support unit 61 is permanently secured to trunk space 17 of vehicle 11 adjacent trunk wall 60. Support unit 61 is shown as a hollow, circular box. The cover of support unit 61 includes a large, square hole comprising an anchor 62 adjacent its center, and a plurality of smaller alignment holes 63 disposed adjacent its perimeter.

Figure 7:
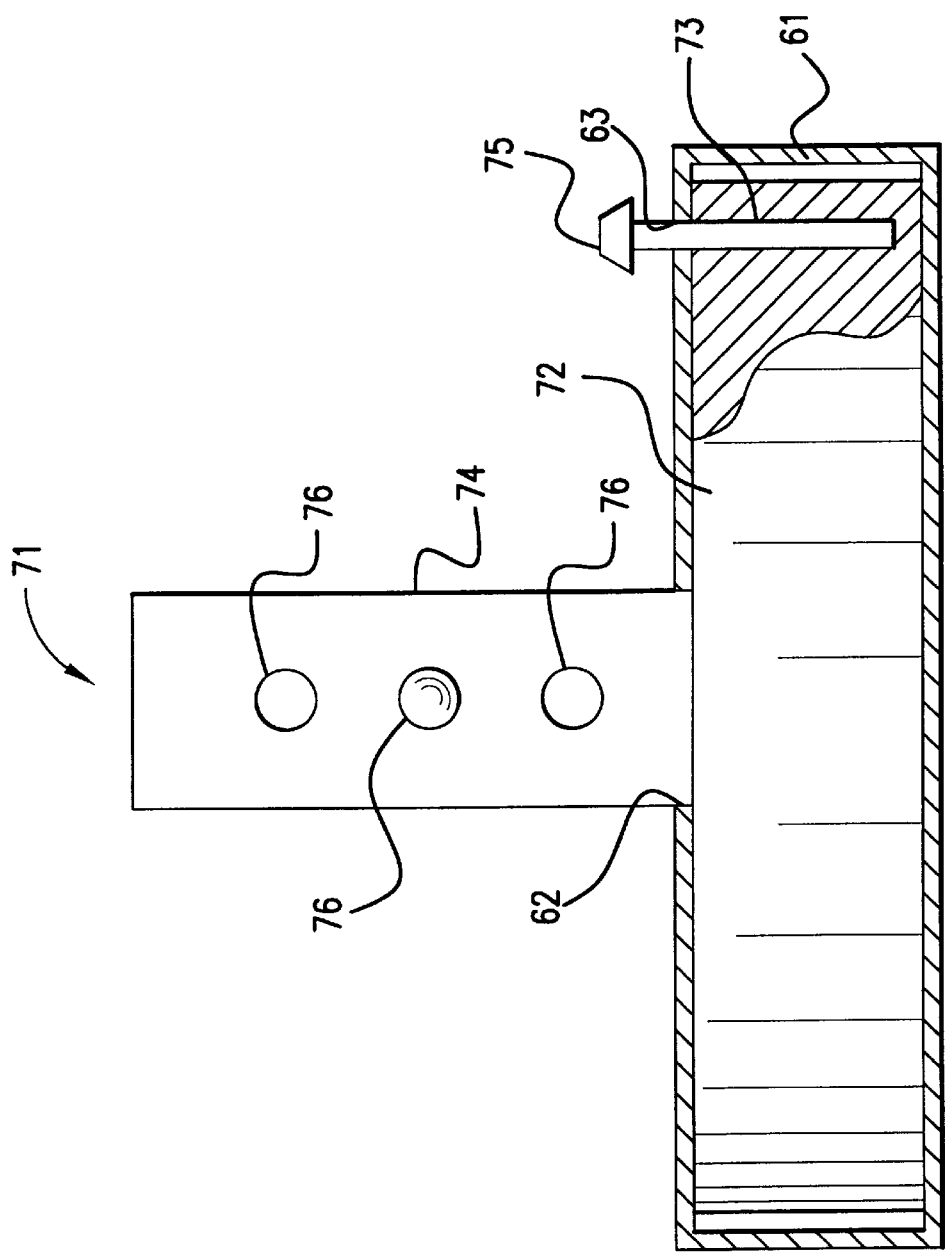
FIG. 7 is a front view of a support unit according to the present invention disposed within a vehicle trunk.
Figure 8:
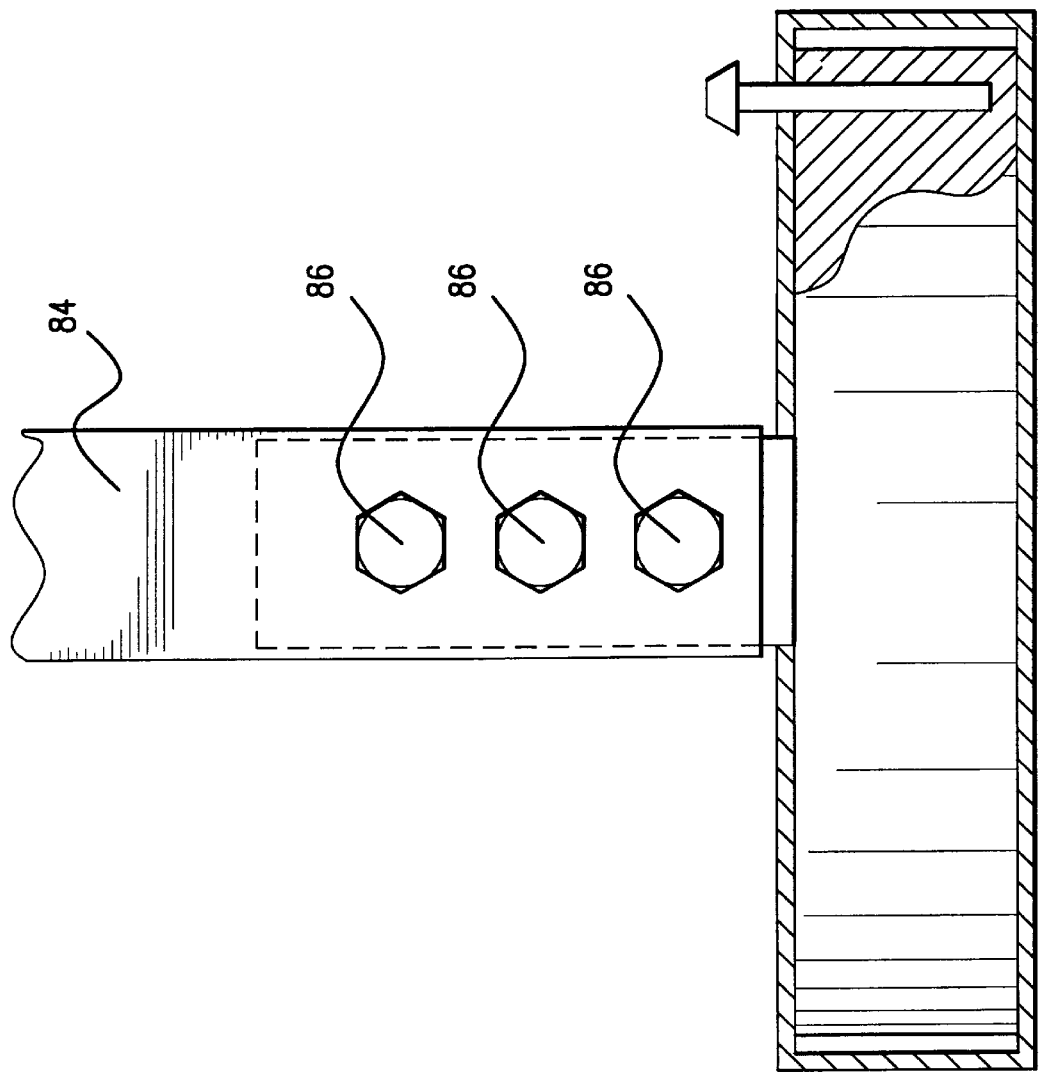
FIG. 8 is a front view of a support unit according to the present invention disposed within a vehicle trunk, where an expandable panel for supporting a screen according to the present invention has been attached to the support unit.

As shown in FIGS. 6–8, a rotatable support plate 71 is housed within support unit 61. Rotatable support plate 71 consists of a disc 72 with a mating alignment hole 73 and a mounting stub 74 which projects out of anchor hole 62. Disc 72 is rotatable 360° within support unit 61 and is fixed in place by inserting pin 75 within both alignment hole 63 and mating alignment hole 73. Three attachment holes 76 are bored into mounting stub 74 for receiving bolts 86. Vertical panel 13 is secured to vehicle 11 by inserting mounting stub 74 within a hollow square member 84 of vertical panel 13 and passing bolts 86 through holes (not shown) in hollow square member 84 and attachment holes 76 of mounting stub 74, as shown in FIG. 8. Alternatively, mounting stub 74 may comprise a hollow post and member 84 of panel 13 may comprise a post which is inserted within stub 74.

By rotating disc 72 within support unit 61, the angle of screen 12 can be varied in relation to vehicle 11. In most anticipated applications, screen 12 would likely be position at a substantially right angle to vehicle 11. However, it may be desirable to position screen 12 at a different angle, for example between 45° and 180° to vehicle 11, depending on the need.

As shown in FIG. 1, adjustable feet 18 are disposed on lateral panels 14, 15, 16 for additional support and stability. Feet 18 may be spike-shaped, so as to be securable into the ground. Alternatively, feet 18 may be flat based, for use on pavement or other hard, flat surfaces.

An additional securing device (not shown) may also be employed to further hold panels 13, 14, 15, 16 in place, where it is expected that accident shield device 10 will be in place for an extended period of time, or when high winds or other adverse conditions are expected. This securing device may be snapped into place at the area where male end 58 and female end 59 of hinge 23 join, to provide additional resistance for catch 51.

Screen 12 is attached to panels 13, 14, 15, 16. Conventional hooks (not shown) may be disposed on screen 12 or VELCRO straps may be used to detachably secure screen 12 to panels 13, 14, 15, 16, thereby permitting hasty attachment and removal of screen 12. Alternatively, screen 12 may be permanently secured to panels 13, 14, 15, 16, so that attachment of screen 12 is not necessary after erecting panels 13, 14, 15, 16.

In the preferred embodiment, screen 12 is formed of a lightweight, non-transparent material, such as plastic or rubber. Screen 12 may be made of a fire-retardant material. Screen 12 is preferably inflatable and may be inflated by compressed gas carried in a safe container within vehicle 11, or by a hand or foot pump, after screen 12 is attached to panels 13, 14, 15, 16. Screen 12 is deflated by opening air valves (not shown) and may be rolled into a cylindrical shape for storage within vehicle 11. Alternatively, screen 12 may be a tarp or other non-inflatable, non-transparent material; in such an embodiment, inflation would not be necessary.

As shown in FIG. 1, screen 12 includes a plurality of air holes 19, which are small enough to permit air to flow through screen 12 while still blocking the view of the accident site. Further, screen 12 may be lit, flashing, or painted on, to assist in traffic movement. An optional, preset official message, directing the actions of motorists, may be inscribed on the screen such as:

MAINTAIN SPEED

SPEED LIMIT____MPH

DO NOT STOP

OBEY POLICE OFFICERS

In use, panels 13, 14, 15, and 16 are stored in their collapsed and folded state within a box in trunk space 17 of vehicle 11. Preferably, screen 12 in its deflated state and a container of compressed gas are also disposed within the box in trunk space 17. Upon arriving at an accident scene, the officer or other emergency personnel in the vehicle can open the box in trunk space 17 and remove panels 13, 14, 15, and 16, screen 12 and the container of compressed gas. panels 13, 14, 15, and 16 are unfolded, as described above. Frame sections 21 of panels 13, 14, 15, and 16 are then expanded, so that spring loaded, button-type catch 51 locks frame sections 21 in their expanded state, and vertical panel 13 is secured to support unit 61, as described above. Adjustable feet 18 disposed on lateral panels 14, 15, 16 are engaged with the ground. Finally, screen 12 is secured to panels 13, 14, 15, 16, and inflated, as described above. If necessary, screen 12 can be rotated via disc 72 and be secured to vehicle 11 at the optimum screening angle.

When the scene has been cleared, accident shield device 10 can be collapsed and folded, as discussed above, and re-stored in trunk space 17 of vehicle 11 for later use.

While the preferred embodiment of the present invention has been described above, it should be understood that it has been presented by way of example, and not limitation. It will be apparent to persons skilled in the relevant art that various changes in form and detail can be made therein without departing from the spirit and scope of the invention. Thus the present invention should not be limited by the above-described exemplary embodiment, but should be defined only in accordance with the following claims and their equivalents.

What is claimed is:

1. An accident shield device for use with a vehicle having a trunk space comprising:

a frame;

a non-transparent inflatable screen secured to said frame, wherein said non-transparent screen is disposed substantially vertically and blocks the view of oncoming traffic;

a base disposed within the trunk space; and a mounting stub which projects upwardly from said base and receives said frame.

2. An accident shield device according to claim 1, wherein said screen is detachably secured to said frame.

3. An accident shield device for use with a vehicle having a trunk space, comprising:

a frame;

a non-transparent, inflatable screen secured to said frame; and mounting means disposed within said vehicle trunk space for mounting said frame within said vehicle trunk space.

4. An accident shield device according to claim 3, wherein said screen is detachably secured to said frame.

5. An accident shield device for use with a vehicle having a trunk space, comprising:

a frame;

a non-transparent screen secured to said frame; and mounting means disposed within said vehicle trunk space for mounting said frame within said vehicle trunk space, wherein said frame is rotatable with respect to said vehicle about said mounting means.

6. An accident shield device according to claim 5, wherein said mounting means comprises:

a cylindrical base disposed within said trunk space; and a mounting stub which projects upwardly from said base and receives said frame.

7. An accident shield device according to claim 5, wherein said screen is inflatable.

8. An accident shield device for use with a vehicle having a trunk space, comprising:

mounting means disposed on said vehicle for attaching said accident shield device to said vehicle;

a plurality of foldable panels, at least one of said panels comprising a plurality of collapsible frame members; and a non-transparent screen secured to said panels;

wherein each of said collapsible frame members includes:

a hinge disposed on said frame member;

a spring loaded button disposed on said frame member adjacent said hinge; and a receiving hole disposed on said frame member adjacent said hinge, wherein said frame member is collapsible by disengaging said spring loaded button from said receiving hole.

9. An accident shield device according to claim 8, wherein said mounting means is disposed within said vehicle trunk space.

10. An accident shield device for use with a vehicle having a trunk space, comprising:

mounting means disposed within said vehicle trunk space for attaching said accident shield device to said vehicle;

a plurality of foldable panels, at least one of said panels comprising a plurality of vertically offset, vertically collapsible frame members;

a non-transparent screen secured to said panels, wherein said non-transparent screen is disposed substantially vertically and blocks the view of oncoming traffic; and a storage box disposed within said trunk space for storing said accident shield device, wherein said accident shield device is storable within said storage box when said frame members are collapsed, said panels are folded, and said accident shield device is detached from said mounting means.

* * * * *